(12) United States Patent

Hong

(10) Patent No.: US 9,209,493 B2
(45) Date of Patent: Dec. 8, 2015

(54) BATTERY PACK

(71) Applicant: Samsung SDI Co., Ltd., Yongin-si, Gyeonggi-do (KR)

(72) Inventor: Sungho Hong, Yongin-si (KR)

(73) Assignee: Samsung SDI Co., Ltd. (KR)

( * ) Notice: Subject to any disclaimer, the term of this patent is extended or adjusted under 35 U.S.C. 154(b) by 84 days.

(21) Appl. No.: 14/132,246

(22) Filed: Dec. 18, 2013

(65) Prior Publication Data

US 2015/0064502 A1 Mar. 5, 2015

(30) Foreign Application Priority Data

Sep. 4, 2013 (KR) ........................ 10-2013-0106194

(51) Int. Cl.
*H01M 10/42* (2006.01)

(52) U.S. Cl.
CPC .. *H01M 10/4257* (2013.01); *H01M 2010/4271* (2013.01)

(58) Field of Classification Search
CPC ................. H01M 10/4257; H01M 2010/4271; H01M 10/4207; H01M 10/42
See application file for complete search history.

(56) References Cited

U.S. PATENT DOCUMENTS

2004/0115528 A1* 6/2004 Helmich ...................... 429/181
2009/0155631 A1* 6/2009 Baek et al. ...................... 429/7
2010/0203374 A1* 8/2010 Kano ........................... 429/100
2011/0086242 A1 4/2011 Lee
2013/0059171 A1 3/2013 Kim et al.

FOREIGN PATENT DOCUMENTS

| JP | H06-049422 | * 2/1994 | ............ B05B 15/04 |
| JP | 2010-182598 | 8/2010 | |
| KR | 2004-0056414 | 7/2004 | |
| KR | 2011-0038914 | 4/2011 | |
| KR | 2013-0025165 | 3/2013 | |

* cited by examiner

*Primary Examiner* — Patrick Ryan
*Assistant Examiner* — Aaron Greso
(74) *Attorney, Agent, or Firm* — Knobbe Martens Olson & Bear LLP

(57) ABSTRACT

A battery pack can stably fix a protection circuit module (PCM) to a battery cell while insulating the PCM. The battery pack includes a battery cell including an electrode assembly, and a case accommodating the electrode assembly and a terrace from which an electrode tab electrically connected to the electrode assembly protrudes, a PCM including a circuit board positioned on the terrace, and an electrode terminal formed on a top surface of the circuit board and connected to the electrode tab, a first insulation tape surrounding the PCM and allowing the PCM to be positioned on a top surface of the terrace, and a second insulation tape surrounding both side surfaces of the case, wherein the first insulation tape includes a body part surrounding the PCM and the terrace and a wing part protruding to both sides of the body part and fixing the body part to the case.

15 Claims, 10 Drawing Sheets

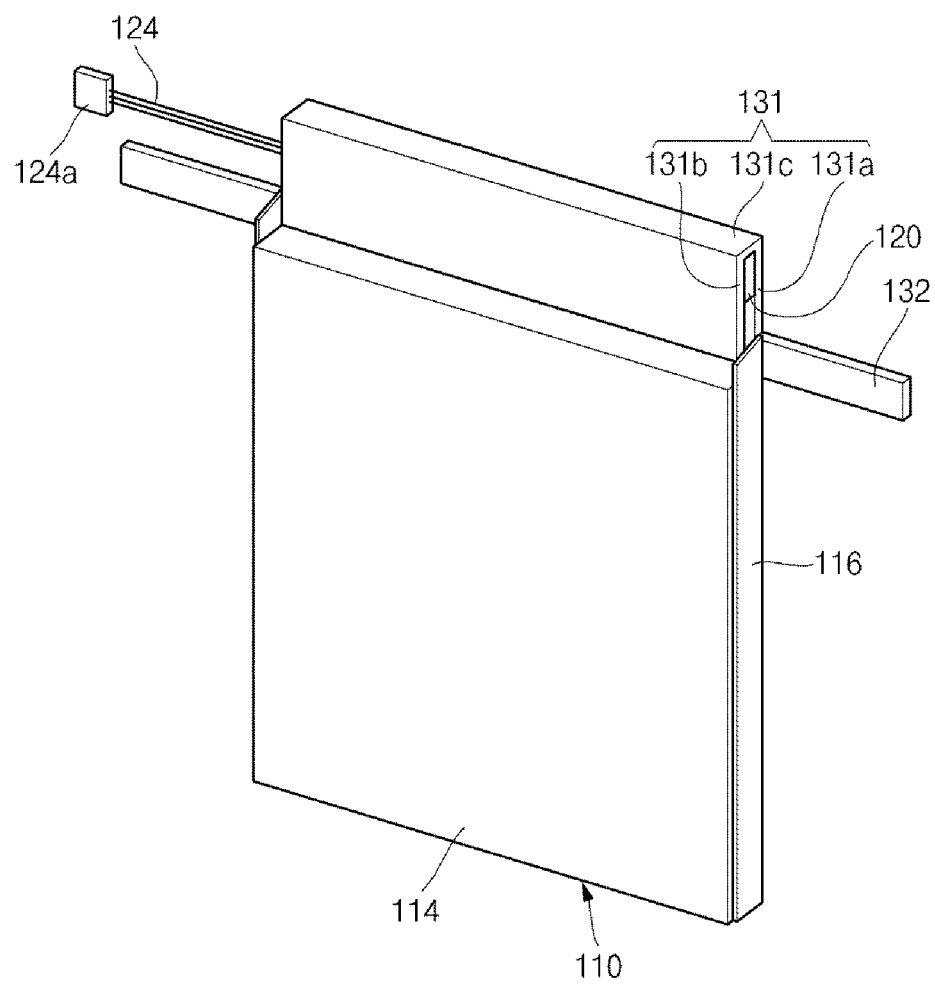

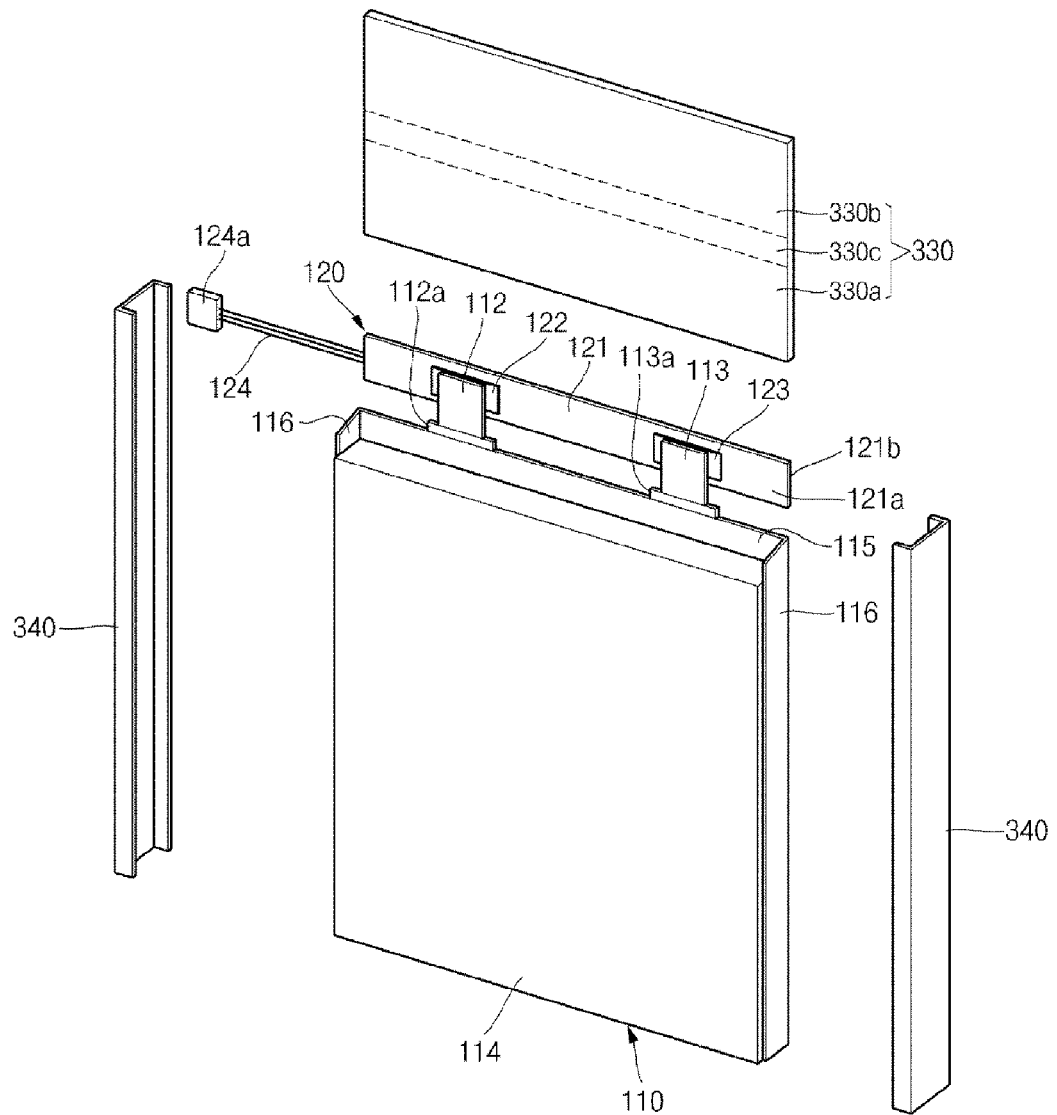

BATTERY PACK

CROSS-REFERENCE TO RELATED APPLICATIONS

This application claims the benefit of Korean Patent Application No. 10-2013-0106194 filed on Sep. 4, 2013, the contents of which are incorporated herein by reference in their entirety.

BACKGROUND

1. Field

Aspects of the present invention relate to a battery pack.

2. Description of the Related Technology

In general, a battery pack includes a rechargeable battery cell and a protection circuit module preventing the battery cell from being over-charged or over-discharged. Recently proposed battery cells generally include lithium ion secondary batteries and lithium ion polymer batteries. The protection circuit module typically includes a plurality of circuit devices for preventing the battery cell from being over-charged or over-discharged.

Lithium ion polymer batteries may be largely classified into a completely solid type lithium ion polymer battery containing no organic electrolytic solution at all, and a lithium ion polymer battery using a gel type polymer electrolyte containing an organic electrolytic solution.

Little or no leakage of an electrolytic solution occurs in the lithium ion polymer battery, compared to a lithium ion battery using a liquid electrolyte. Therefore, the lithium ion polymer battery may use a pouch consisting of a metal foil and an insulation layer, instead of a metal can, as a case.

SUMMARY OF CERTAIN INVENTIVE ASPECTS

Aspects of the present invention provide a battery pack, which can stably fix a protection circuit module to a battery cell while insulating the protection circuit module.

According to aspects of the present invention, there is provided a battery pack including a battery cell including an electrode assembly and a case accommodating the electrode assembly and a terrace from which an electrode tab electrically connected to the electrode assembly protrudes, a protection circuit module including a circuit board positioned on the terrace and an electrode terminal formed on a top surface of the circuit board and connected to the electrode tab, a first insulation tape surrounding the protection circuit module and allowing the protection circuit module to be positioned on a top surface of the terrace, and a second insulation tape surrounding both side surfaces of the case, wherein the first insulation tape includes a body part surrounding the protection circuit module and the terrace and a wing part protruding to both sides of the body part and fixing the body part to the case.

The body part may include a first region surrounding a bottom surface of the circuit board and a bottom surface of the terrace; a second region surrounding a top surface of the circuit board and a top surface of the terrace; and a bent region formed between the first region and the second region.

The wing part may be formed on the first region and may protrude from both sides of the first region.

The wing part may protrude from a bottom portion of the first region to be adhered to a top portion of the first region.

The electrode tab may protrude from the terrace to be bent in a 'U' shape and the second region may be positioned inside the bent electrode tab.

The second region may be positioned between the protection circuit module and the terrace and may be bent in a 'U' shape.

The first insulation tape may be formed in an inverted T ($\perp$) shape.

The first insulation tape may be formed of a nonwoven tape.

A top surface of the circuit board and a top surface of the terrace may be opposite to and may face each other.

The second insulation tape may be formed to extend to the terrace.

The second insulation tape may be formed to cover the wing part.

According to aspects of the present invention, there is provided a battery pack including a battery cell including an electrode assembly and a case accommodating the electrode assembly and a terrace from which an electrode tab electrically connected to the electrode assembly protrudes; a protection circuit module including a circuit board positioned on the terrace and an electrode terminal formed on a top surface of the circuit board and connected to the electrode tab; a first insulation tape surrounding the protection circuit module and allowing the protection circuit module to be positioned on a top surface of the terrace; and a second insulation tape surrounding both side surfaces of the case and both side surfaces of the first insulation tape.

The first insulation tape may include a first region surrounding a bottom surface of the circuit board and a bottom surface of the terrace; a second region surrounding a top surface of the circuit board and a top surface of the terrace; and a bent region formed between the first region and the second region.

The electrode tab may protrude from the terrace and the second region may be positioned inside the bent electrode tab.

The second region may be positioned between the protection circuit module and the terrace and may be bent in a 'U' shape.

The first insulation tape may be formed of a nonwoven tape.

A top surface of the circuit board and a top surface of the terrace may be opposite to and may face each other.

As described above, the battery pack according to embodiments of the present invention includes a first insulation tape having a body part surrounding a protection circuit module and a wing part fixing the body part, thereby fixing the protection circuit module to a battery cell while insulating the protection circuit module.

Additional aspects and/or advantages of the invention will be set forth in part in the description which follows and in part will be obvious from the description or may be learned by practice of the invention.

BRIEF DESCRIPTION OF THE DRAWINGS

The aspects, features and advantages of embodiments of the present invention will be more apparent from the following detailed description in conjunction with the accompanying drawings, in which:

FIGS. 4A to 4D are perspective views illustrating a method of attaching a first insulation tape and a second insulation tape;

FIG. 7 is an exploded perspective view of the battery pack shown in FIG. 6.

DETAILED DESCRIPTION OF CERTAIN INVENTIVE EMBODIMENTS

Hereinafter, examples of embodiments of the present invention will be described in detail with reference to the accompanying drawings such that they can easily be made and used by those skilled in the art.

Figure 1:
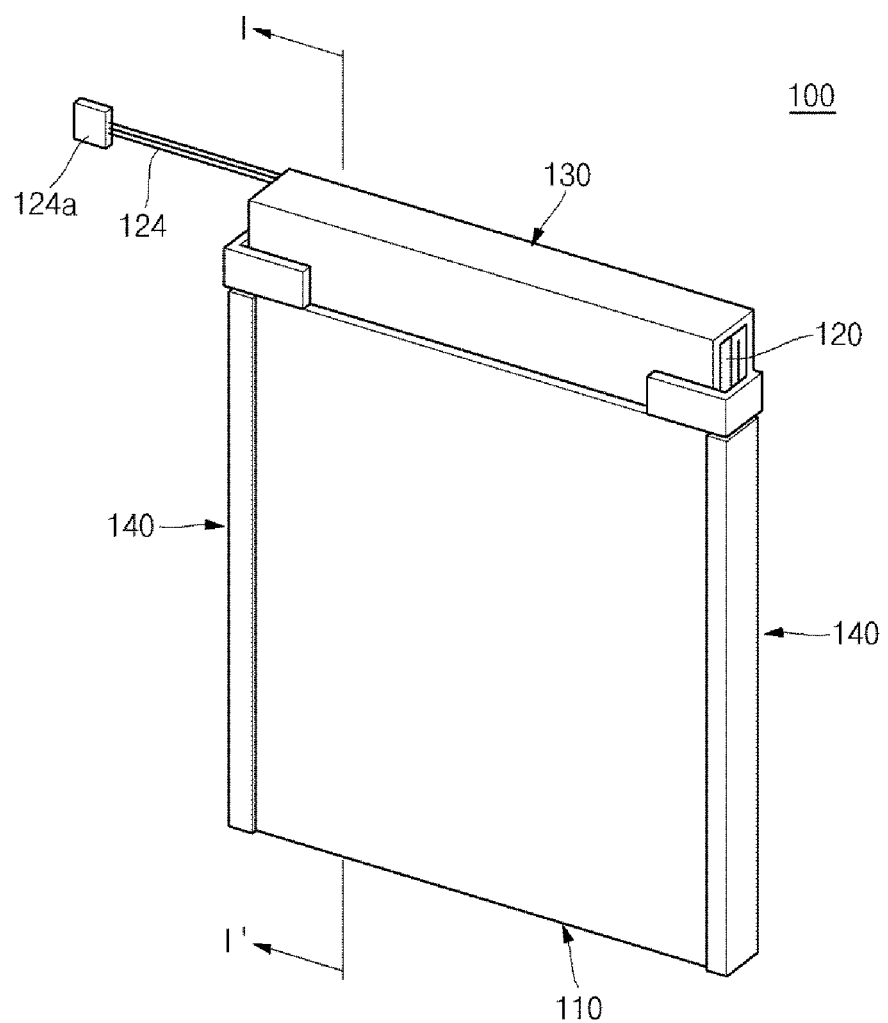
FIG. 1 is a perspective view of a battery pack according to an embodiment of the present invention.
Figure 2:
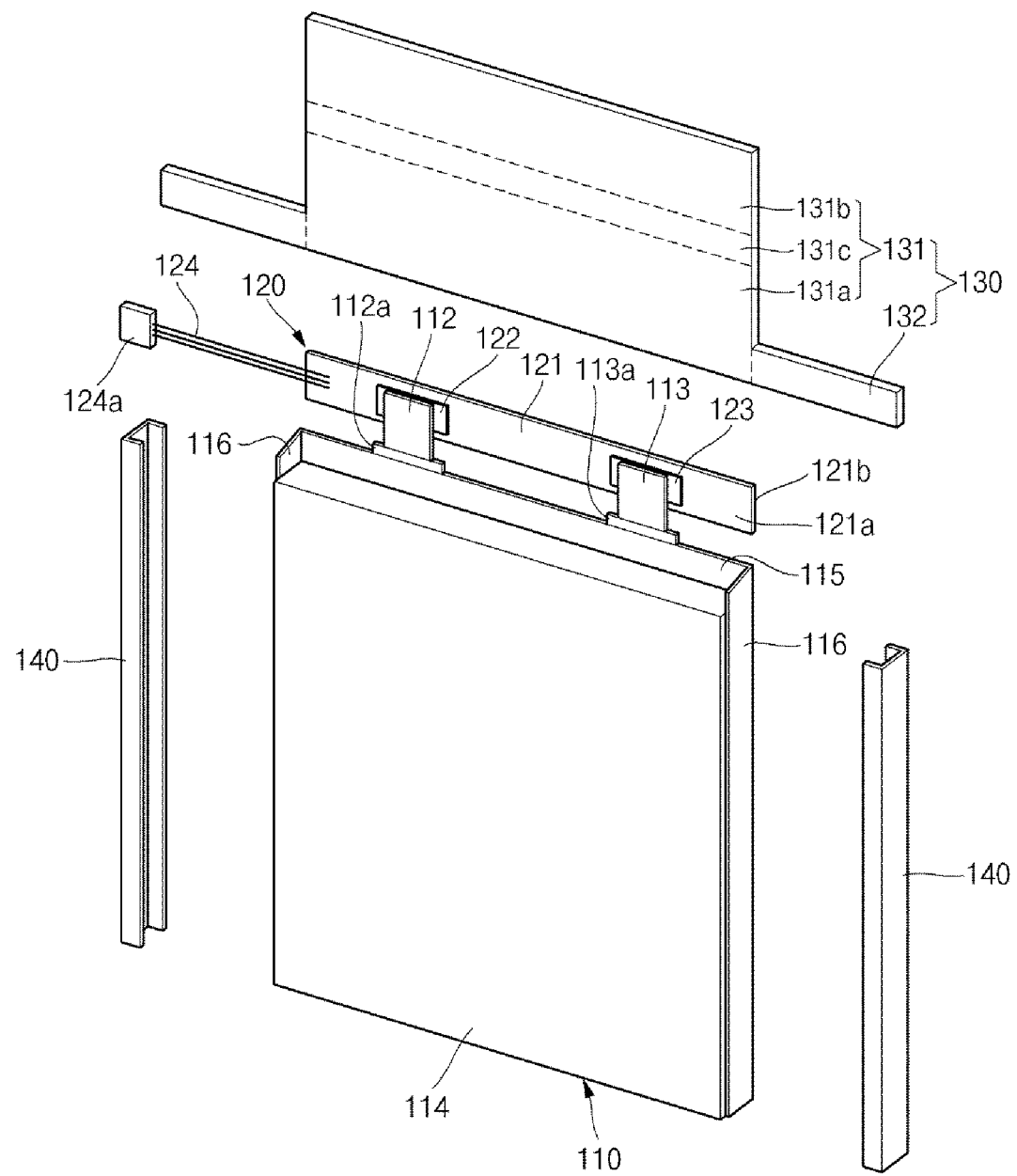
FIG. 2 is an exploded perspective view of the battery pack shown in FIG. 1.
Figure 3:
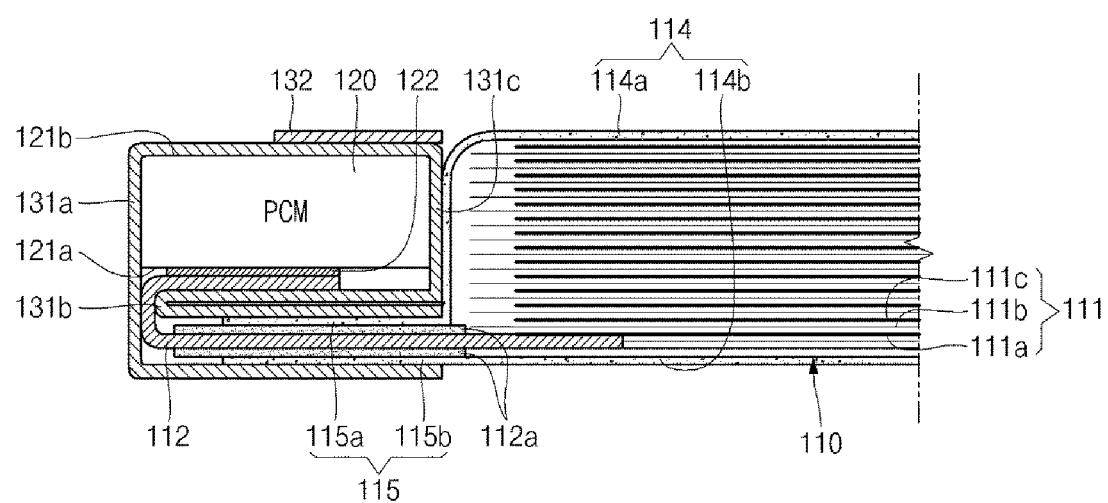
FIG. 3 is a cross-sectional view taken along the line I-I' of FIG. 1.

FIG. 1 is a perspective view of a battery pack according to an embodiment of the present invention, FIG. 2 is an exploded perspective view of the battery pack shown in FIG. 1, and FIG. 3 is a cross-sectional view taken along the line I-I' of FIG. 1.

Referring to FIGS. 1 to 3, the battery pack 100 includes a battery cell 110, a protection circuit module (PCM) 120, a first insulation tape 130 and a second insulation tape 140.

The battery cell 110 includes an electrode assembly 111 having a positive electrode 111a, a negative electrode 111c and a separator 111b interposed between the positive electrode 111a and the negative electrode 111c, a positive electrode tab 112 connected to a positive electrode 111a of the electrode assembly 111, a negative electrode tab 113 connected to the negative electrode 111c of the electrode assembly 111, and a case 114 accommodating the electrode assembly 111 and exposing the positive electrode tab 112 and the negative electrode tab 113 to the outside. An electrolytic solution (not shown) is accommodated in the case 114 with the electrode assembly 111. In addition, the case 114 includes a terrace 115 extending a predetermined length to the outside and a bent part 116 extending a predetermined length to opposite sides to then be bent.

The positive electrode 111a may be formed by coating a positive electrode active material (lithium metal oxide) on both surfaces of, for example, an aluminum foil, and the negative electrode 111c may be formed by coating a negative electrode active material (such as, for example, carbon) on both surfaces of, for example, a copper foil. However, the present invention does not limit the material of the positive electrode 111a or the negative electrode 111c to those listed herein. In addition, the separator 111b may be made of, for example, porous polypropylene (PP) or porous polyethylene (PE) to allow lithium ions to easily move between the positive electrode 111a and the negative electrode 111c. However, the present invention does not limit the material of the separator 111b to those listed herein.

The positive electrode tab 112 may be made of aluminum, and the negative electrode tab 113 may be made of nickel, but not limited thereto. In addition, the positive electrode tab 112 and the negative electrode tab 113 extend a predetermined length to the outside through the terrace 115. Further, the positive electrode tab 112 and the negative electrode tab 113 are surrounded by the insulation tapes 112a and 113a, respectively, thereby preventing the positive electrode tab 112 and the negative electrode tab 113 from being electrically shorted to the terrace 115.

The case 114 may be formed in a pouch type so as to accommodate the electrode assembly 111 to then be sealed. The case 114 may generally include a metal foil and an insulation layer formed on top and bottom surfaces of the metal foil. The metal foil may be made of, for example, aluminum, stainless steel or an equivalent thereof. In addition, the insulation layer formed on the bottom surface of the metal foil may be made of cast polypropylene (CPP) or an equivalent thereof, and the insulation layer formed on the top surface of the metal foil may be made of nylon, polyethyleneterephthalate (PET) or an equivalent thereof. However, the present invention does not limit the materials of the metal foil and the insulation layer to those listed herein.

The terrace 115 and the bent part 116 are formed by compressing edges of the case 114 after the electrode assembly 111 is accommodated in the case 114. A protruding part of each of the positive electrode tab 112 and the negative electrode tab 113 corresponds to the terrace 115, and the other part of each of the positive electrode tab 112 and the negative electrode tab 113 corresponds to the bent part 116. A bottom surface 115b of the terrace 115 may be coplanar with a bottom surface 114b of the case 114 surrounding the electrode assembly 111. In addition, a top surface 115a of the terrace 115 may be positioned to be lower than a top surface 114a of the case 114 surrounding the electrode assembly 111. Therefore, a space for accommodating the protection circuit module 120 is provided on the terrace 115.

The protection circuit module 120 is positioned on the top surface 115a of the terrace 115 provided in the case 114. The protection circuit module 120 is electrically connected to the battery cell 110 to control charging/discharging of the battery cell 110. The protection circuit module 120 includes a circuit board 121, a positive electrode terminal 122, a negative electrode terminal 123 and a power wire 124.

The circuit board 121 is formed of a plate made of resin and may include a circuit (not shown) for controlling charging and discharging of the battery cell 110, or a protection circuit (not shown), such as a circuit for preventing the battery cell 110 from being over-charged or over-discharged.

In addition, a positive electrode terminal 122 and a negative electrode terminal 123 are formed on the top surface 121a of the terrace 115. The positive electrode terminal 122 is formed of a substantially rectangular flat plate, and the positive electrode tab 112 is connected to the positive electrode terminal 122. The positive electrode tab 112 is electrically to the positive electrode terminal 122 by welding. The positive electrode tab 112 is bent from the terrace 115 in a roughly 'U' shape and its end is then connected to the positive electrode terminal 122. The negative electrode terminal 123 is formed of a substantially rectangular flat plate, and the negative electrode tab 113 is connected to the negative electrode terminal 123. The negative electrode tab 113 is electrically to the negative electrode terminal 123 by welding. The negative electrode tab 113 is bent from the terrace 115 in a roughly 'U' shape and its end is then connected to the negative electrode terminal 123.

In addition, the power wire 124 is formed at one side of the circuit board 121. One end of the power wire 124 is electrically connected to the circuit board 121 and the other end of the power wire 124 is connected to a connector 124a. The power wire 124 may be connected to an external set or a charger.

The first insulation tape 130 surrounds the protection circuit module 120. The first insulation tape 130 includes a body part 131 and a wing part 132 protruding from both sides of the body part 131. The first insulation tape 130 is formed in a substantially inverted T (⊥) shape. In addition, the first insulation tape 130 is formed of a nonwoven tape having good electrically insulating property. Therefore, the first insulation tape 130 may prevent the protection circuit module 120 and the case 114 from being electrically shorted therebetween.

The body part 131 surrounds the protection circuit module 120, and the wing part 132 fixes the protection circuit module 120 to the battery cell 110. After the body part 131 surrounds the protection circuit module 120, it allows the protection circuit module 120 to be positioned on the top surface 115a of the terrace 115 and the wing part 132 to be adhered to the body part 131, thereby fixing the protection circuit module 120 to the battery cell 110.

The body part 131 includes a first region 131a surrounding a bottom surface 121b of the circuit board 121 and a bottom surface 115b of the terrace 115, a second region 131b surrounding a top surface 121a of the circuit board 121 and a top surface 115a of the terrace 115, and a bent region 131c positioned between the first region 131a and the second region 131b. The first region 131a is a region that is substantially exposed to the outside. The second region 131b and the bent region 131c are positioned between the protection circuit module 120 and the case 114 and are not exposed to the outside. The second region 131b is positioned between the positive electrode tab 112 and the negative electrode tab 113, which are bent in a substantially 'U' shape, and the second region 131b is formed in a substantially 'U' shape. Since the second region 131b is bent along with the positive electrode tab 112 and the negative electrode tab 113 when the positive electrode tab 112 and the negative electrode tab 113 are bent, it is formed in two folds. Therefore, the second region 131b may more securely prevent shorts between each of the positive electrode tab 112 and the negative electrode tab 113 and the case 114.

In addition, the wing part 132 is formed on the first region 131a of the body part 131 and protrudes to both sides of the first region 131a. The wing part 132 protrudes from a bottom portion to both sides of the first region 131a to then be attached to the first region 131a to surround a top portion of the first region 131a.

The second insulation tape 140 surrounds both side surfaces of the case 114. The second insulation tape 140 fixes the bent part 116 of the case 114 to the case 114. The second insulation tape 140 is formed in a substantially 'U' shape so as to surround the top surface 114a of the case 114, the bent part 116 and the bottom surface 114b of the case 114. The second insulation tape 140 is formed so as not to extend over the terrace 115 while surrounding side surfaces of the case 114. The second insulation tape 140 may be formed of a general vinyl tape.

FIGS. 4A to 4D are perspective views illustrating a method of attaching a first insulation tape and a second insulation tape.

Referring to FIGS. 4A to 4D, a method of attaching the first insulation tape 130 and the second insulation tape 140 to the case 114 will now be described.

Figure 4A:
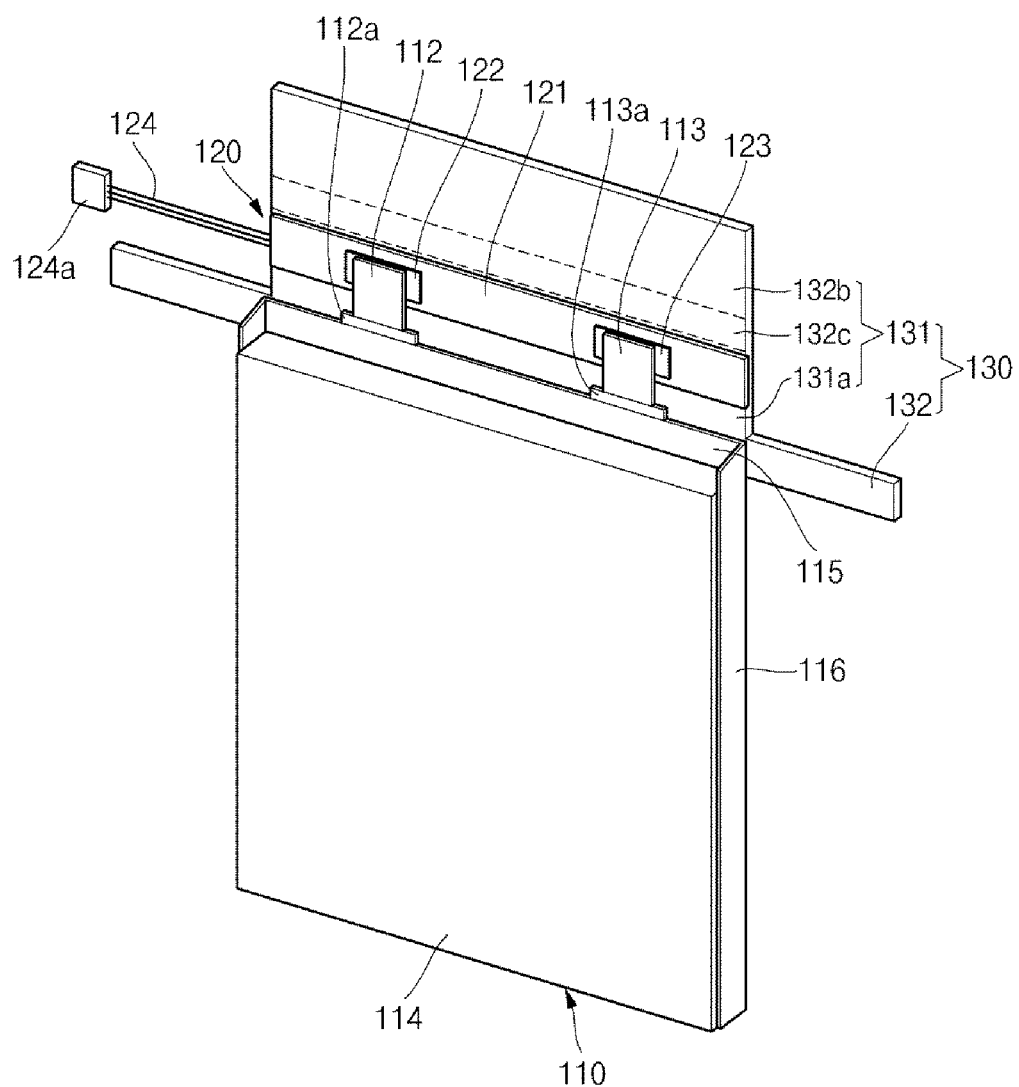

First, as shown in FIG. 4A, the first insulation tape 130 is made to contact with the bottom surface 115b of the terrace 115. The first region 131a of the first insulation tape 130 is positioned to surround the bottom surface 115b of the terrace 115 and the bottom surface 121b of the circuit board 121. Here, the wing part 132 protrudes to both side surfaces of the case 114.

Next, as shown in FIG. 4B, the first insulation tape 130 is bent to allow the first insulation tape 130 to surround the top surface 121a of the circuit board 121. The first insulation tape 130 is bent to allow the second region 131b of the first insulation tape 130 to be positioned so as to surround the top surface 121a of the circuit board 121 and the top surface 115a of the terrace 115.

Figure 4C:
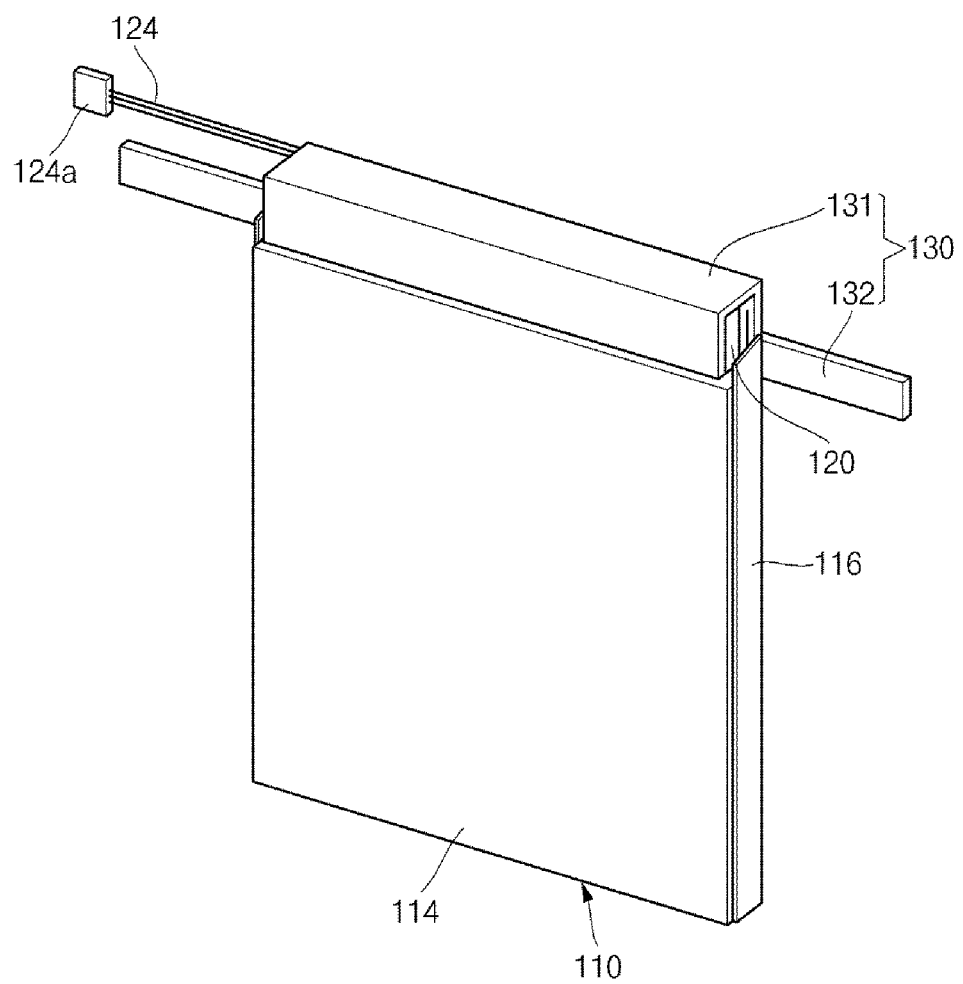

Next, as shown in FIG. 4C, the protection circuit module 120 is positioned on the top surface 115a of the terrace 115. The positive electrode tab 112 and the negative electrode tab 113 connected to the protection circuit module 120 are bent, and the first insulation tape 130 is also bent along with the positive electrode tab 112 and the negative electrode tab 113. The positive electrode tab 112 and the negative electrode tab 113 are bent in a substantially 'U' shape and the second region 131b is also bent in a substantially 'U' shape. In addition, the second region 131b of the first insulation tape 130 is bent to be brought into contact with each other. In addition, the top surface 121a of the circuit board 121 and the top surface 115a of the terrace 115 are opposite to and face each other.

Figure 4D:
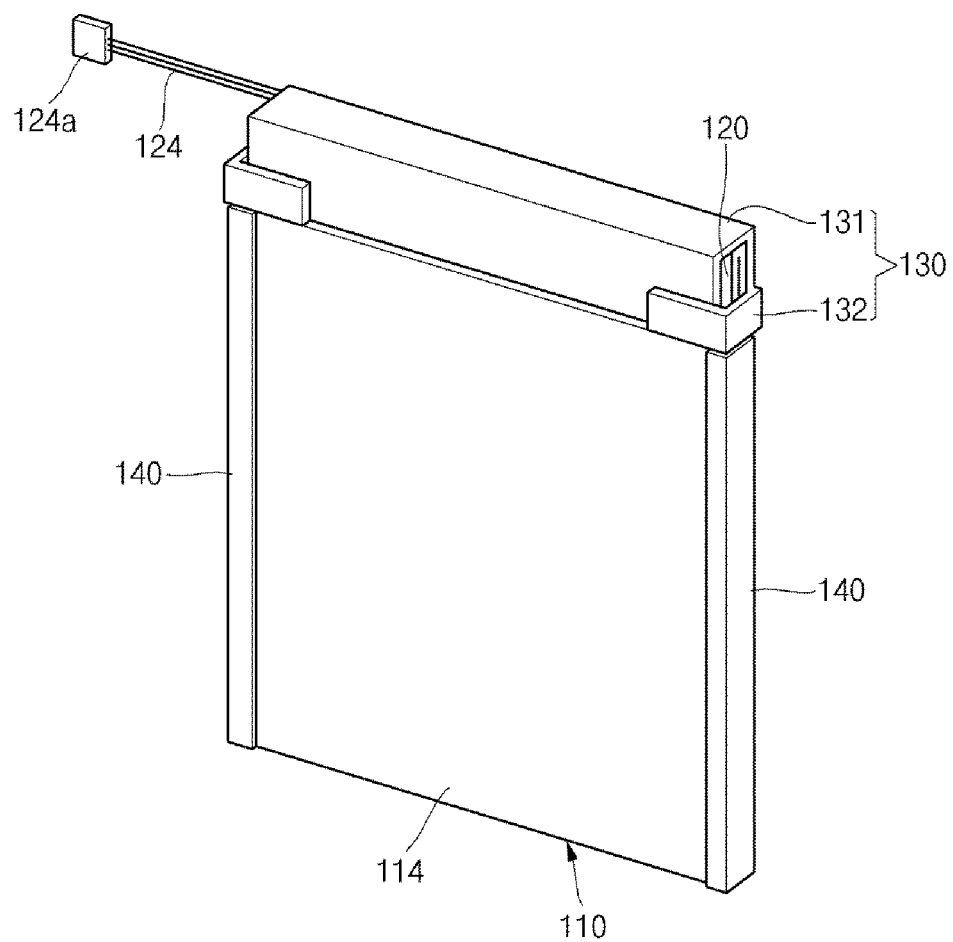

Finally, as shown in FIG. 4D, the wing part 132 is bent to fix the body part 131 to the terrace 115 and the second insulation tape 140 is adhered to the side surfaces of the case 114, thereby fixing the bent part 116 to the case 114. As the result, the first insulation tape 130 can fix the protection circuit module 120 to the battery cell 110 while insulating the protection circuit module 120.

As described above, the battery pack 100 according to embodiments of the present invention includes the first insulation tape 130 having the body part 131 surrounding the protection circuit module 120 and the wing part 132 fixing the body part 131, thereby fixing the protection circuit module 120 to the battery cell 110 while insulating the protection circuit module 120.

Figure 5:
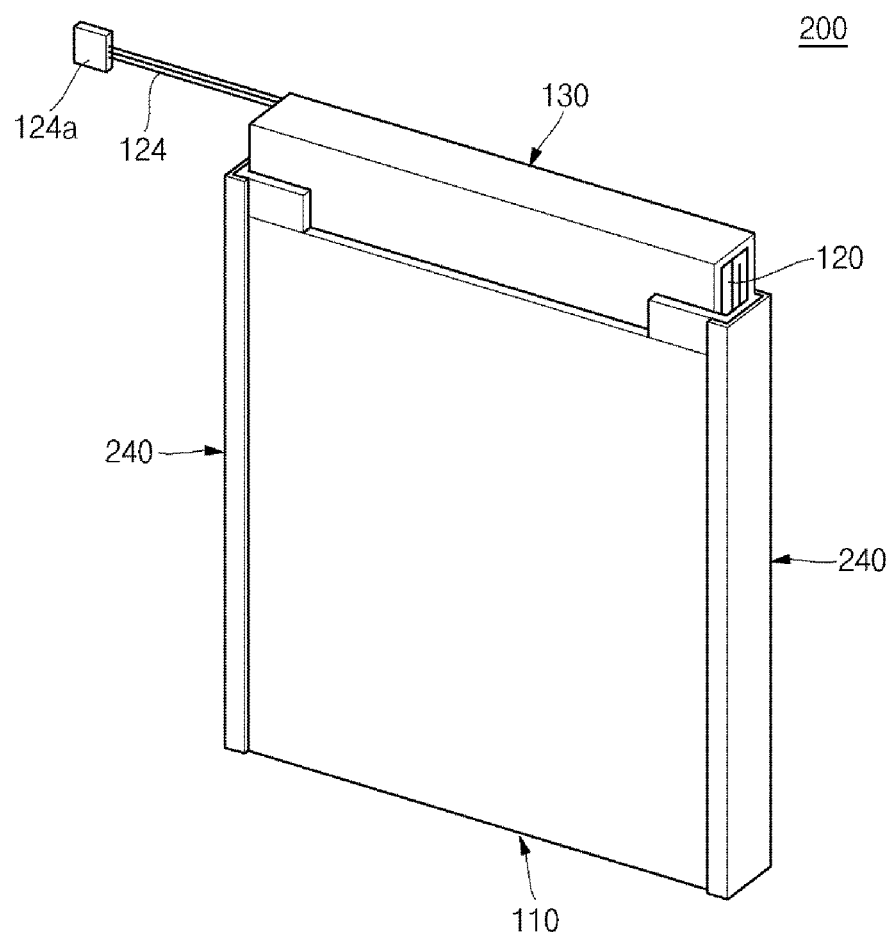
FIG. 5 is a perspective view of a battery pack according to another embodiment of the present invention.

FIG. 5 is a perspective view of a battery pack according to another embodiment of the present invention.

The battery pack 200 shown in FIG. 5 is substantially the same as the battery pack 100 shown in FIG. 1 in view of configuration and functions, except for the shape of a second insulation tape 240. Accordingly, repeated explanations will be omitted and the following description will focus on the second insulation tape 240.

Referring to FIG. 5, the battery pack 200 according to an embodiment includes a battery cell 110, a protection circuit module 120, a first insulation tape 130 and a second insulation tape 240.

The second insulation tape 240 surrounds both side surfaces of a case 114. The second insulation tape 240 may fix a bent part 116 of the case 114 to the case 114. The second insulation tape 240 is formed in a substantially 'U' shape to surround a top surface 114a of the case 114, the bent part 116 and a bottom surface 114b of the case 114. In addition, the second insulation tape 240 surrounds the side surfaces of the case 114 and is formed to extend over terrace 115 a formed in the case 114. The second insulation tape 240 is formed to cover a wing part 132 of the first insulation tape 130. Therefore, the second insulation tape 240 may more firmly fix the protection circuit module 120 fixed by the first insulation tape 130.

Figure 6:
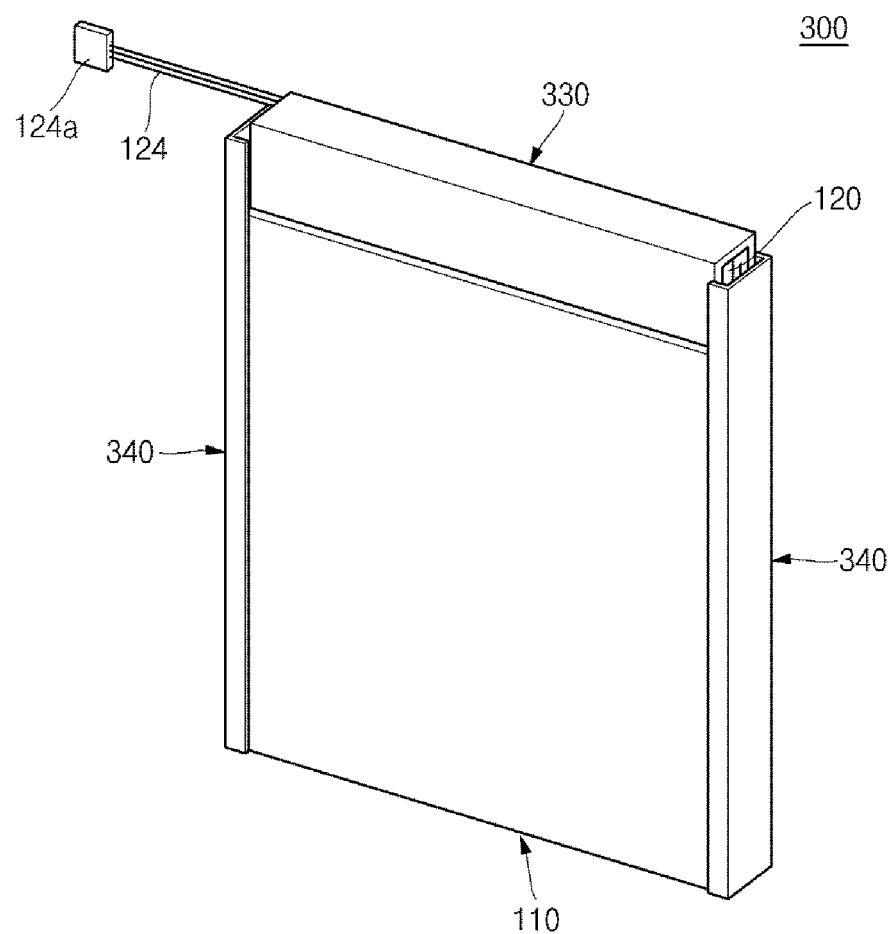
FIG. 6 is a perspective view of a battery pack according to still another embodiment of the present invention.

FIG. 6 is a perspective view of a battery pack according to still another embodiment of the present invention and FIG. 7 is an exploded perspective view of the battery pack shown in FIG. 6.

The battery pack 300 shown in FIG. 6 is substantially the same as the battery pack 100 shown in FIG. 1 in view of configuration and functions. Accordingly, repeated explanations will be omitted and the following description will focus on differences between the battery packs 100 and 300.

Referring to FIGS. 6 and 7, the battery pack 300 includes a battery cell 110, a protection circuit module 120, a first insulation tape 330 and a second insulation tape 340. A wing part 132 is not provided in the first insulation tape 330, unlike in the first insulation tape 130 shown in FIG. 2.

The first insulation tape 330 surrounds the protection circuit module 120. The first insulation tape 330 is formed of a substantially rectangular flat plate. The first insulation tape 330 includes a first region 330a surrounding a bottom surface 121b of a circuit board 121 and a bottom surface 115b of a terrace 115, a second region 330b surrounding a top surface 121a of the circuit board 121 and a top surface 115a of the terrace 115, and a bent region 330c positioned between the first region 330a and the second region 330b. The first region 330a is a region that is substantially exposed to the outside. The second region 330b and the bent region 330c are positioned between the protection circuit module 120 and the case 114 and are not exposed to the outside. The second region 330b is positioned between a positive electrode tab 112 and a negative electrode tab 113, which are bent in a substantially 'U' shape, and the second region 330b is formed in a substantially 'U' shape. Since the second region 330b is bent along with the positive electrode tab 112 and the negative electrode tab 113 when the positive electrode tab 112 and the negative electrode tab 113 are bent, it is formed in two folds. Therefore, the second region 330b may more securely prevent shorts between each of the positive electrode tab 112 and the negative electrode tab 113 and the case 114.

The second insulation tape 340 surrounds both side surfaces of the case 114. The second insulation tape 340 fixes the bent part 116 of the case 114 to the case 114. The second insulation tape 340 is formed in a substantially 'U' shape so as to surround the top surface 114a of the case 114, the bent part 116 and the bottom surface 114b of the case 114. In addition, the second insulation tape 340 is formed to extend over the terrace 115 while surrounding side surfaces of the case 114. The second insulation tape 340 is formed to cover the first insulation tape 330. Therefore, the second insulation tape 340 may fix the protection circuit module 120 insulated from the case 114 by the first insulation tape 330 to a battery cell 110.

Although certain embodiments of a battery pack have been described, it will be understood by those skilled in the art that a variety of modifications and variations may be made to the present invention without departing from the spirit or scope of the present invention defined in the appended claims, and their equivalents.

What is claimed is:

1. A battery pack comprising:
   a battery cell that comprises:
      an electrode assembly, and
      a case accommodating the electrode assembly and a terrace from which an electrode tab electrically connected to the electrode assembly protrudes;
   a protection circuit module that comprises:
      a circuit board positioned on the terrace, and
      an electrode terminal formed on a top surface of the circuit board and connected to the electrode tab;
   a first insulation tape surrounding the protection circuit module and allowing the protection circuit module to be positioned on a top surface of the terrace; and
   a second insulation tape surrounding both side surfaces of the case,
   wherein the first insulation tape comprises a body part surrounding the protection circuit module and the terrace, and a wing part protruding to both sides of the body part and fixing the body part to the case,
   wherein the body part of the first insulation tape comprises:
      a first region surrounding a bottom surface of the circuit board and a bottom surface of the terrace;
      a second region surrounding a top surface of the circuit board and a top surface of the terrace; and
      a bent region formed between the first region and the second region,
   wherein the wing part of the first insulation tape is formed on the first region and extends beyond the sides of the first region to cover the circuit board.

2. The battery pack of claim 1, wherein the wing part protrudes from a bottom portion of the first region to be adhered to a top portion of the first region.

3. The battery pack of claim 1, wherein the electrode tab protrudes from the terrace to be bent in a shape and the second region is positioned inside the bent electrode tab.

4. The battery pack of claim 1, wherein the second region is positioned between the protection circuit module and the terrace and is bent in a shape.

5. The battery pack of claim 1, wherein the first insulation tape is formed in an inverted T (⊥) shape.

6. The battery pack of claim 1, wherein the first insulation tape is formed of a nonwoven tape.

7. The battery pack of claim 1, wherein a top surface of the circuit board and a top surface of the terrace are opposite to and face each other.

8. The battery pack of claim 1, wherein the second insulation tape is formed to extend to the terrace.

9. The battery pack of claim 8, wherein the second insulation tape is formed to cover the wing part.

10. A battery pack comprising:
    a battery cell including an electrode assembly, and a case accommodating the electrode assembly and a terrace from which an electrode tab electrically connected to the electrode assembly protrudes;
    a protection circuit module including a circuit board positioned on the terrace and an electrode terminal formed on a top surface of the circuit board and connected to the electrode tab;
    a first insulation tape surrounding the protection circuit module and allowing the protection circuit module to be positioned on a top surface of the terrace; and
    a second insulation tape surrounding both side surfaces of the case and both side surfaces of the first insulation tape.

11. The battery pack of claim 10, wherein the first insulation tape includes:
    a first region surrounding a bottom surface of the circuit board and a bottom surface of the terrace;
    a second region surrounding a top surface of the circuit board and a top surface of the terrace; and
    a bent region formed between the first region and the second region.

12. The battery pack of claim 11, wherein the electrode tab protrudes from the terrace to be bent in a 'U' shape and the second region is positioned inside the bent electrode tab.

13. The battery pack of claim 11, wherein the second region is positioned between the protection circuit module and the terrace and is bent in a 'U' shape.

14. The battery pack of claim 10, wherein the first insulation tape is formed of a nonwoven tape.

15. The battery pack of claim 10, wherein a top surface of the circuit board and a top surface of the terrace are opposite to and face each other.

* * * * *

UNITED STATES PATENT AND TRADEMARK OFFICE
CERTIFICATE OF CORRECTION

| | |
|---|---|
| PATENT NO. | : 9,209,493 B2 |
| APPLICATION NO. | : 14/132246 |
| DATED | : December 8, 2015 |
| INVENTOR(S) | : Sungho Hong |

It is certified that error appears in the above-identified patent and that said Letters Patent is hereby corrected as shown below:

In the Claims

At column 8, line 10, in Claim 3, after "in a" insert --'U'--.

At column 8, line 14, in Claim 4, after "in a" insert --'U'--.

Signed and Sealed this
Twenty-eighth Day of June, 2016

Michelle K. Lee
*Director of the United States Patent and Trademark Office*